Figure 1:
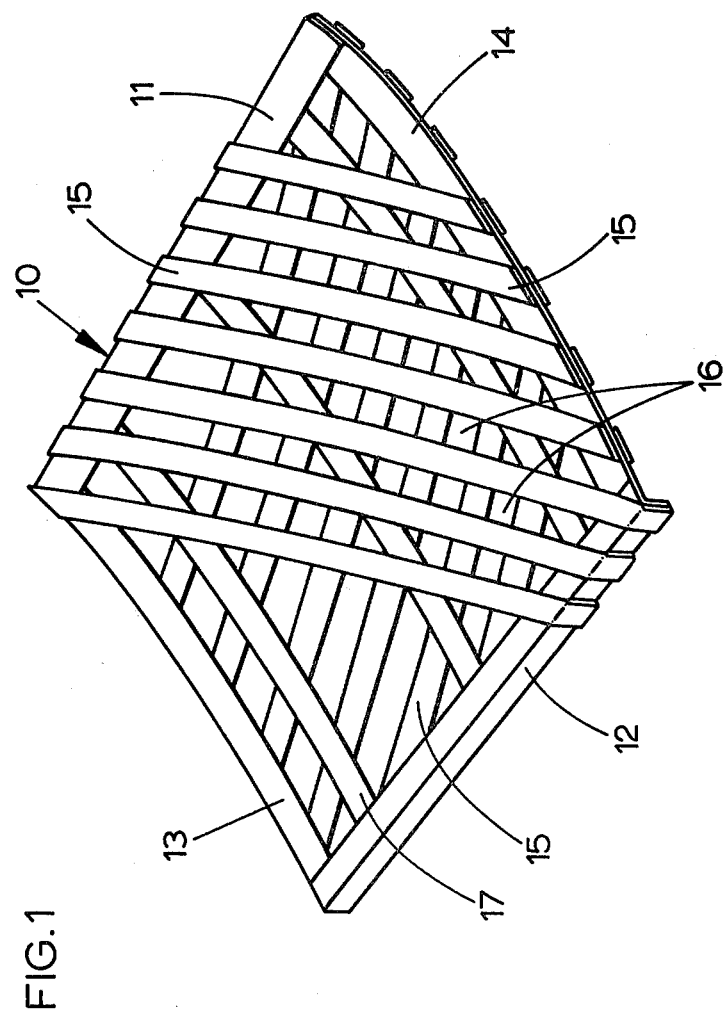

United States Patent [19]

Wheeler

[11] 4,236,593
[45] Dec. 2, 1980

[54] AIR CUSHION VEHICLE FLEXIBLE SKIRTS

[75] Inventor: Raymond L. Wheeler, Cowes, England

[73] Assignee: British Hovercraft Corporation, Yeovil, England

[21] Appl. No.: 15,403

[22] Filed: Feb. 26, 1979

Related U.S. Application Data

[63] Continuation of Ser. No. 817,863, Jul. 21, 1977, abandoned.

[30] Foreign Application Priority Data

Jul. 22, 1976 [GB] United Kingdom ............... 30487/76

[51] Int. Cl.³ .............................................. B60V 1/16
[52] U.S. Cl. .................................................. 180/128
[58] Field of Search .......................... 180/128, 127, 116

[56] References Cited

U.S. PATENT DOCUMENTS

| | | | |
|---|---|---|---|
| 3,375,894 | 4/1968 | Riddle | 180/128 |
| 3,384,197 | 5/1968 | Bingham | 180/128 |
| 3,397,753 | 8/1968 | Hunt | 180/127 |
| 3,618,695 | 11/1971 | Wheeler | 180/128 |
| 3,677,361 | 7/1972 | Bertin | 180/127 |
| 3,770,079 | 11/1973 | Wheeler | 180/127 |
| 3,807,754 | 4/1974 | Rodenbach | 280/743 |
| 3,901,988 | 8/1975 | Coles | 180/128 |
| 4,056,645 | 11/1977 | Henry | 180/128 |

*Primary Examiner*—John P. Silverstrim
*Attorney, Agent, or Firm*—Larson, Taylor and Hinds

[57] ABSTRACT

A bag member for an air cushion vehicle flexible skirt has an apertured portion by which a space enclosed by the bag member and hard structure of a vehicle to which it is attached, is placed in communication with the vehicle cushion area. The apertured portion comprises a plurality of strips of flexible material laid across each other so as to form apertures therebetween. The apertured portion may be formed by a plurality of apertured panels comprising the aperture-forming strips of flexible material joined to strips of flexible material defining side edges of each panel.

6 Claims, 4 Drawing Figures

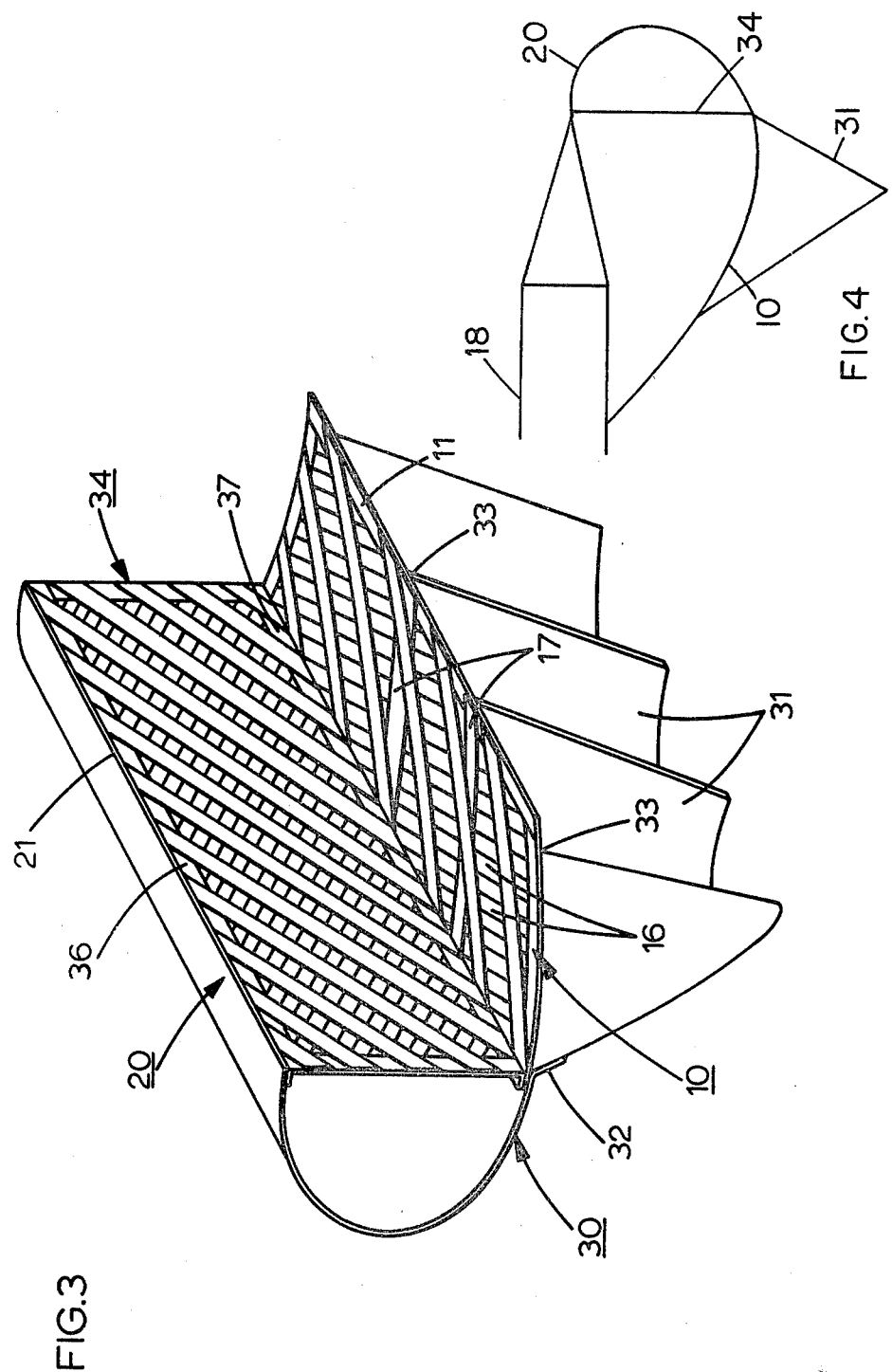

AIR CUSHION VEHICLE FLEXIBLE SKIRTS

This is a continuation of application Ser. No. 817,863 filed July 21, 1977, (now abandoned).

This invention relates to air cushion vehicles and is especially concerned with flexible cushion-containing skirts that are used as at least a part of the cushion sealing means on air cushion vehicles.

Air cushion vehicles may be fully skirted or may be of the sidewall type in which cushion containment is effected partly by rigid sidewalls. While the invention is applicable to both types of vehicle it is most beneficial in connection with the fully skirted type of vehicle and will, therefore, be discussed and described in connection therewith.

One flexible skirt that has been developed and extensively used on operational air cushion vehicles is of a two-part configuration, the upper part of the skirt being formed as an inflatable bag member that is stiffened by being inflated, while the lower part of the skirt is formed by a plurality of adjacent and independent flexible skirt elements known in the art as "fingers."

The bag member of this skirt is manufactured from flexible impermeable sheet material and has two opposed edges fixed to the vehicle hard structure along fixing lines that are spaced apart so that the sheet material extends between them in a continuous loop to enclose the outlet end of a peripherally extending duct leading from a plenum chamber formed by the vehicle hard structure. In operation, pressurized air is delivered to the plenum chamber and flows through the peripherally extending duct to inflate the bag member. The section of the bag member that faces the cushion area beneath the vehicle is apertured to permit the air with which it is inflated to escape in a controlled manner into the cushion area to build up and sustain the cushion of pressurized air on which the vehicle is supported above the surface over which it operates. The apertures in the bag member take the form of circular holes cut in the flexible impermeable sheet material, and the total cross-section area of these holes is such as to give a pressure drop between the air inflating the bag member and the air forming the cushion.

A problem with this particular skirt configuration is associated with the holes provided in the bag member. The flexible sheet material from which the bag member is manufactured is formed from woven nylon fabric impregnated with rubber so as to make it impermeable. When a hole is cut in this sheet material the warp and weft threads of the woven fabric are broken in the area of the hole, and the load around the edge of the hole has to be carried by a single thread. We have found that the continuous flexing of the bag during operation causes these threads to fatigue and subsequently fail, leading to a breakdown of the material at the edge of the hole which generally results in tearing of the material under the loads being carried by the bag member.

It is an object of the present invention to improve the fatigue life of the apertured portion of a bag member for use in an air cushion vehicle flexible skirt.

It is another object of the invention to provide an apertured portion of such a bag member in which local failure of the material around one aperture is unable to propagate so as to result in continuous tearing of the apertured portion under loads being carried by the bag member.

Accordingly, in its broadest aspect the present invention provides a flexible panel for use in forming at least a part of an apertured portion of a bag member for an air cushion vehicle flexible skirt, the panel comprising a plurality of strips of flexible material laid across each other so as to form apertures therebetween that communicate between one side of the panel and the other, the ends of the strips being attached to strips of flexible material that define the side edges of the flexible panel.

Another aspect of the present invention provides a bag member for use as at least a part of an air cushion vehicle flexible skirt, the bag member having an apertured portion formed by one or more flexible panels, the or each flexible panel comprising a plurality of strips of flexible material laid across each other so as to form apertures therebetween that communicate between one side of the panel and the other, the ends of the strips being attached to strips of flexible material that define the side edges of the or each flexible panel.

Preferably, the aperture-forming strips intersect the side edge strips at angles other than normal, and if desired additional strips may be fixed to extend between the side edge strips so as to be normal thereto.

The aperture-forming strips may be fixed to each other at those places where they cross each other by any suitable means such as, for example, bonding.

The strips of flexible material may be manufactured from woven or knitted nylon threads or cords, and if desired they may be impregnated with rubber or any other suitable material to make them impermeable. Fabric tapes having the desired strength properties or tapes having a tyre cord type of reinforcement, are suitable alternatives.

A further aspect of the invention provides an air cushion vehicle having cushion sealing means constituted at least in part be a flexible skirt including an inflatable bag member attached to the vehicle hard structure along fixing lines that are spaced apart and one of which is situated outboard of the other with respect to the vehicle cushion area, an apertured part of the bag member that extends downwardly from the inner fixing line to border the vehicle cushion area comprising a plurality of strips of flexible material laid across each other so as to form apertures therebetween, whereby the space enclosed by the bag member and the vehicle hard structure is placed in communication with the vehicle cushion area.

In operation of the vehicle pressurized air is supplied by one or more lift fans on the vehicle to inflate the bag member, and some of this inflation air passes through the apertures to build up and sustain the air cushion beneath the underside of the vehicle hard structure.

The total cushion feed area of the bag member is governed by the number of apertures and the area of each individual aperture. By varying the total aperture area the ratio of the bag inflation pressure to the cushion pressure can be varied. Thus the present invention can be used to provide a bag member having a large cushion feed area so that in operation the ratio of the bag member inflation pressure to the cushion pressure is close to but not smaller than one (1.0), as well as to provide a bag member having a high bag to cushion pressure ratio, i.e. in the order of 1.3 to 2.0.

A plurality of individual flexible skirt elements, such as those of the type known in the art as "fingers," may be fixed to the bag member so as to depend downwardly therefrom forming a lower part of the flexible skirt.

It has been found necessary to provide the bag member of a prior art flexible skirt with a longitudinally extending web member having a lower edge attached at or near a lower interior part of the bag member and an upper edge attached at or near an upper interior part of the bag member, usually the outer fixing line of the bag member. One purpose of this web member is to stiffen the bag member, thereby changing its natural frequency of vibration and thus avoiding problems associated with skirt bounce. Over at least a part of its length this web member is provided with apertures that may have non-return flap valves so as to permit inflation air to flow from a compartment formed by one side of the web and the bag member to a compartment formed by the other side of the web member and the bag member. It may be found necessary to similarly compartment a bag member in accordance with the present invention. Such compartmentation is conveniently provided by a web member extending between the outer fixing line of the bag member to vehicle hard structure and the junction of the apertured portion of the bag member with flexible sheet material forming the other part of the bag member.

This web member may be of apertured construction similar to the apertured portion of the bag member, although it will usually have a smaller total aperture area so that air is more readily retained in the outboard compartment of the bag member.

The invention will now be further described, by way of example only, with reference to the accompanying drawings, in which:—

Figure 2:
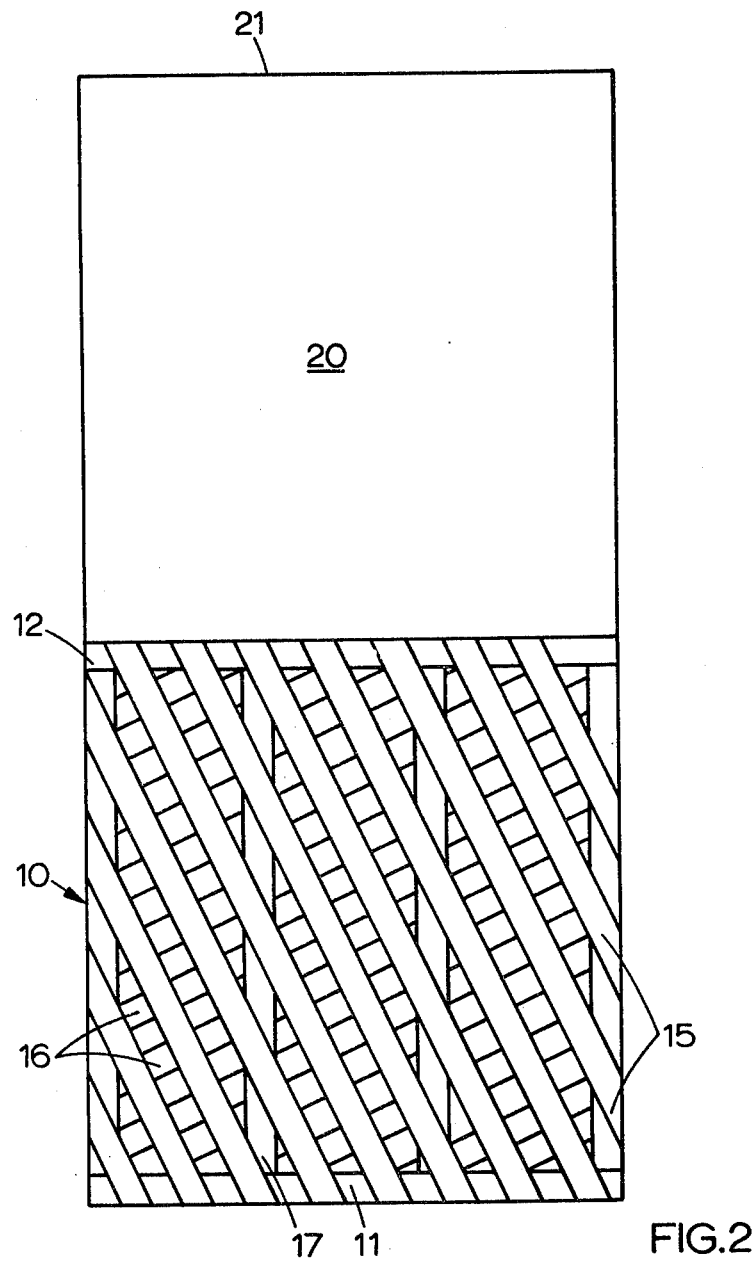

FIG. 1 shows a flexible panel suitable for use in forming a part of an apertured portion of a bag member for an air cushion vehicle flexible skirt in one embodiment of the invention, FIG. 2 shows a developed plan of a segment of a bag member having an apertured portion formed by a flexible panel similar to that shown in FIG. 1, FIG. 3 is a perspective view of an air cushion vehicle flexible skirt in another embodiment of the invention, and FIG. 4 is a side elevational view of the embodiment shown in FIG. 3.

A flexible panel 10 suitable for use in forming a part of an apertured portion of a bag member for an air cushion vehicle flexible skirt is illustrated in FIG. 1. The panel 10 comprises four side edge strips of flexible material 11, 12, 13 and 14, respectively, joined at their ends so as to define a substantially square or rectangular outline shape. A plurality of strips of flexible material 15 are laid across each other so as to form apertures 16 therebetween that communicate between one side of the panel and the other. The ends of the strips 15 are joined with one or other of the side edge strips 11, 12, 13 or 14, respectively, the strips 15 intersecting the side edge strips at an angle other than normal. The strips 15 and the side edge strips, 11, 12, 13 and 14 are manufactured from woven nylon fabric that is impregnated with natural or synthetic rubber. The strips 15 are fixed together where they overlap each other by bonding or vulcanizing, and are similarly fixed at their ends to the side edge strips.

One side edge strip 11 is arranged for attachment to the hard structure of an air cushion vehicle by releasable fastening means (not shown) such as is disclosed in U.S.A. Pat. No. 3,244,248, and the opposed side edge strip 12 is arranged for attachment to a sheet of flexible impermeable material (not shown in FIG. 1) that forms another part of a bag member for a flexible skirt. The opposed side edge strips 13 and 14 are arranged for attachment to corresponding side edge strips of other panels making up the bag member of a flexible skirt assembly. Additional strips of flexible material 17 are arranged at intervals between the side edge strips 13 and 14 so as to be substantially parallel therewith and have their opposed ends attached to the side edge strips 11 and 12, respectively, the strips 17 forming bases for the attachment of web members (not shown) to which the top edge of flexible independent skirt members, such as fingers, are bolted to form the lower part of a flexible skirt.

FIG. 2 illustrates a segment of a bag member that comprises an apertured portion formed by a flexible panel 10 substantially as hereinbefore described with reference to and shown in FIG. 1 of the accompanying drawings, and a panel 20 formed from flexible impermeable sheet material joined by a bolted and bonded joint to the side edge strip 12 of the panel 10. An edge 21 of the panel 20 that is opposed to the side edge strip 11 of the panel 10 is arranged for attachment to hard structure of an air cushion vehicle (not shown) by releasable fastening means (not shown) such as disclosed in U.S.A. Pat. No. 3,244,248.

A segment of an air cushion vehicle flexible skirt is shown in FIG. 3 and comprises a bag member 30 formed by bolting, in edge to edge relationship, a plurality of bag segments substantially as hereinbefore described with reference to and as shown in FIG. 2, only one such bag segment being shown in FIG. 3, from which depend a plurality of independent skirt elements 31 of the type known in the art as "fingers." It will be seen from FIG. 3 that the panel 20 is attached to the panel 10 so as to leave an overlapping portion of the panel 20 that forms an apron 32 to which the top outermost parts of the fingers 31 are fixed by bolting. The top edges 33 of the fingers 31 are bolted to L or T-sectioned web members (not shown in FIG. 3) that are manufactured from flexible material and are in turn bolted to the strips 17 of the flexible panel 10. The edge 21 of the panel 20 is fastened to vehicle hard structure outboard of the vehicle hard structure to which the edge 11 of the panel 10 is fastened so that when inflated by pressurized air from a lift fan on the vehicle the bag member is inflated substantially to the shape shown in FIG. 3. Some of this air flows through the apertures 16 in the flexible panel 10 to inflate the fingers 31 and to build up and sustain the cushion of air on which the vehicle is supported.

As shown in FIG. 3 the bag member 30 is provided with an anti-vibration web 34 that is formed from a plurality of panels constructed in a similar manner to the panels 10 of the bag member 30, only one of the panels forming the anti-vibration web 34 being shown in FIG. 3. This panel has a side edge strip 36 attached to the panel 20 of the bag member 30 near to the edge 21, and an opposed side edge strip 37 attached to the side edge strip 12 of the panel 10 where it joins with the panel 20. By joining together a plurality of segments of a flexible skirt having the form shown in FIG. 3, a flexible skirt may be provided that extends around the whole or a part of the periphery of an air cushion vehicle.

In operation, the loads in the apertured portion of the bag member are carried by the flexible strips making up the panel 10 and pressurized air passes through the apertures formed therebetween. Should one of these strips fail in fatigue, the surrounding strips take up the additional load, so that a continuing tear along the apertured portion of the bag member does not occur.

Thus the present invention is particularly suited for use in the bag member of a flexible skirt that is to have a low cushion-to-bag pressure ratio, say in the order of 1.05 to 1.0. In such a skirt the bag member will have a larger total aperture area than would be the case for a high cushion-to-bag pressure ratio. In a bag member in accordance with the prior art this would necessitate cutting a large number of holes in the flexible sheet forming the bag member so that if a fatigue failure occurred at one of these holes it would quickly propagate into a continuous tear in the apertured portion of the bag member due to the weakening effect of the large number of holes. In an apertured portion constructed in accordance with the present invention after complete failure of one of the strips in fatigue the failure is arrested so that a new fatigue failure has to propagate in the next adjacent strip in order for the failure to continue along the apertured portion.

Of course, the invention as hereinbefore described with reference to and as shown in the accompanying drawings is by way of example only, modifications being possible without departing from the scope of the invention. For instance, the aperture-forming strips of flexible material need not be impermeable, and they may be formed from strips of permeable fabric, such as knitted or woven nylon fabric. Furthermore, the aperture-forming strips of flexible material need not be fixed together at those places where they cross each other.

I claim as my invention:—

1. An air cushion for a vehicle having a rigid body structure, means on the vehicle for forming a cushion of pressurised air between the underside of the rigid body structure and a surface over which the vehicle is supported during operation, cushion sealing means extending downwardly from said rigid body structure to encompass said cushion of pressurised air, said cushion sealing means including a flexible skirt assembly of two-part configuration in which an upper part is formed by an inflatable bag member attached to the vehicle hard structure along inner and outer fixing lines which are spaced apart and one of which is situated outboard of the other with respect to the air cushion, said bag member comprising an outwardly disposed section formed from reinforced flexible impermeable sheet material extending generally downwardly from attachment to said vehicle body structure at said outer fixing line to terminate at a lower edge, and an inwardly disposed section formed by two criss-crossed sets of discrete ribbons, each of said ribbons comprising a fabric formed of reinforced flexible impermeable material extending between attachment with the lower edge of said outwardly disposed section and attachment at said inner fixing line on said vehicle body structure, the ribbons of each set being disposed in parallel, spaced apart relationship throughout their length whereby apertures defined by longitudinal edge portions of said discrete ribbons place the space enclosed by the bag member and the rigid body structure in communication with the air cushion.

2. An air cushion vehicle according to claim 1 wherein said inwardly disposed section comprises side edge ribbons joining the end portions of said two sets of criss-crossed ribbons, said criss-cross ribbons being disposed at oblique angles with respect to the side edge strips.

3. An air cushion vehicle according to claim 2 and further including additional ribbons extending between the side edge strips and disposed normal thereto.

4. An air cushion vehicle according to claim 2 wherein the criss-cross ribbons are fixed to each other where said ribbons intersect.

5. An air cushion vehicle according to claim 1 and further including an antivibration web comprising a plurality of spaced apart strips of reinforced flexible impermeable material so as to provide apertures therebetween, said antivibration web extending from attachment to the bag member adjacent the outer fixing line to attachment with the bag member adjacent the junction of the outwardly disposed section and inwardly disposed section of the bag member.

6. An air cushion vehicle according to claim 1 and further including a plurality of finger shaped independent skirt elements secured to the lower edge of the outwardly disposed section of said bag member and to the underside of the inwardly disposed section of said bag member.

* * * * *